United States Patent
Bergmans et al.

(10) Patent No.: US 8,687,221 B1
(45) Date of Patent: Apr. 1, 2014

(54) CREATING A PRINTED MATERIAL INSPECTION SCRIPT AND INSPECTING PRINTED MATERIAL ACCORDING TO A SCRIPT

(71) Applicant: Euresys SA, Angleur (BE)

(72) Inventors: Patrick P. J. E. Bergmans, Ghent (BE); Yves R. Joskin, Esneux (BE); René L. Delbar, Rumst (BE)

(73) Assignee: Euresys SA, Liege (BE)

( * ) Notice: Subject to any disclaimer, the term of this patent is extended or adjusted under 35 U.S.C. 154(b) by 0 days.

(21) Appl. No.: 13/712,670

(22) Filed: Dec. 12, 2012

Related U.S. Application Data

(60) Provisional application No. 61/569,927, filed on Dec. 13, 2011, provisional application No. 61/640,580, filed on Apr. 30, 2012.

(51) Int. Cl.
*G06F 3/12* (2006.01)
*G06F 15/00* (2006.01)
*H04N 1/46* (2006.01)

(52) U.S. Cl.
USPC ........... 358/1.15; 358/1.13; 358/504; 358/1.9

(58) Field of Classification Search
None
See application file for complete search history.

(56) References Cited

U.S. PATENT DOCUMENTS

| | | | |
|---|---|---|---|
| 6,678,067 B1 | 1/2004 | Reda et al. | |
| 2004/0086156 A1* | 5/2004 | Furukawa et al. | 382/112 |
| 2004/0179717 A1 | 9/2004 | Furukawa et al. | |
| 2009/0148004 A1 | 6/2009 | Kimura | |
| 2011/0216345 A1 | 9/2011 | Horn | |
| 2011/0222106 A1 | 9/2011 | Grodsky et al. | |
| 2012/0070040 A1* | 3/2012 | Vans et al. | 382/112 |

FOREIGN PATENT DOCUMENTS

| | | |
|---|---|---|
| EP | 0803356 | 10/1997 |
| EP | 0781655 | 9/2001 |
| WO | WO 95/31333 | 11/1995 |
| WO | WO 2005/104659 | 11/2005 |
| WO | WO 2007/086052 | 8/2007 |
| WO | WO 2008/107892 | 9/2008 |

OTHER PUBLICATIONS

International Preliminary Report on Patentability for PCT Application PCT/IL2007/000086 mailed Jul. 29, 2008.
International Preliminary Report on Patentability for PCT Application PCT/IL2008/000297 mailed Sep. 8, 2009.
Thomas Hoffmann-Walbeck: JDF-Integration and Automation, International Circle of Educational Institutes for Graphic Arts Technology and Management (IC), Issue No. 1 2008, article retrieved Nov. 24, 2011 at http://www.hdm-stuttgart.de/international_circle/circular/issues/08_01/ICJ_Computer-Aided Inspection Planning-The state of the art01_04_hoffmann-walbeck.pdf.

(Continued)

*Primary Examiner* — Thierry L Pham
(74) *Attorney, Agent, or Firm* — Dov Rosenfeld; Inventek

(57) ABSTRACT

Embodiments of the present invention include a method, an apparatus, a system, and logic encoded in one or more computer-readable tangible media to carry out a method. The method in some versions forms a script that is usable by an inspection system for inspecting printed material produced according to a printing workflow. The method in some versions inspects printed material produced according to a printing workflow, the inspecting including executing a script.

28 Claims, 10 Drawing Sheets

(56) References Cited

OTHER PUBLICATIONS

Also available at: http://web.archive.org/web/20100916221458/http://www.eyec.de/eyec-en/02-products/04-proofrunner-en.html.

Fiona Zhao, Xun Xu, S. Q. Xie: Computer-Aided Inspection Planning-The state of the art, Computers in Industry, vol. 60, Issue 7, Sep. 2009, pp. 453-466.

"Heidelberg Prinect Press Center press control station" retrieved Dec. 11, 2012 from http://www.piworld.com/masterspecifier/?q=company&cat=5154&comp=37733.

"Prinect Color and Quality: Multicolor Workflow" retrieved Dec. 11, 2012 from http://www.heidelberg.com/www/binaries/bin/files/dotcom/en/prinect/multicolor_en.pdf. Printed Oct. 2009.

"The Heidelberg Prinect Press Center" retrieved Dec. 11, 2012 from http://www.heidelberg.com/www/binaries/bin/files/dotcom/en/products/prinect/press_center.pdf.

"JDF—Integration and Automation" retrieved Nov. 24, 2011 from http://www.hdm-stuttgart.de/international_circle/circular/issues/08_01/ICJ_01_04_hoffmann-walbeck.pdf.

Wikipedia article titled "Composite pattern" retrieved Dec. 7, 2011 from http://en.wikipedia.org/wiki/Composite_pattern.

Wikipedia article titled "International Color Consortium" retrieved Dec. 7, 2011 from http://en.wikipedia.org/wiki/International_Color_Consortium.

Wikipedia article titled "Job Definition Format" retrieved Dec. 8, 2011 from http://en.wikipedia.org/wiki/Job_Definition_Format.

Wikipedia article titled "Scalable Vector Graphics" retrieved Dec. 7, 2011 from http://en.wikipedia.org/wiki/Svg.

* cited by examiner

CREATING A PRINTED MATERIAL INSPECTION SCRIPT AND INSPECTING PRINTED MATERIAL ACCORDING TO A SCRIPT

RELATED PATENT APPLICATIONS

This invention is related to and claims priority of U.S. Provisional Patent Applications No. 61/569,927 filed 13 Dec. 2011 and No. 61/640,580 filed 30 Apr. 2012, both to inventors Bergmans et al., both titled "CREATING A PRINTED MATERIAL INSPECTION SCRIPT AND INSPECTING PRINTED MATERIAL ACCORDING TO A SCRIPT." The contents of each of such Applications Nos. 61/569,927 and 61/640,580 are incorporated herein by reference in their entireties.

COPYRIGHT & TRADEMARK NOTICES

A portion of the disclosure of this patent document may contain material that is subject to copyright protection. The copyright owner has no objection to the facsimile reproduction by any one of the patent document or the patent disclosure, as it appears in the files or records of any patent office in which the disclosure is filed, e.g., the U.S. Patent and Trademark Office, but otherwise reserves all copyrights whatsoever.

Certain marks referenced herein may be trademarks or registered trademarks of third parties. Use of these marks is solely for providing an enabling disclosure by way of example and is not to be construed as limiting the scope of this invention to material associated with such trademarks.

FIELD OF THE INVENTION

The present disclosure relates generally to printing, i.e., creating printed material using one or more colorants such as inks on a substrate such as paper, foil, cardboard, and other substrates, including subsequent finishing and converting operations, and in particular to planning inspection of printed material and the automatic inspection of printed material.

BACKGROUND

Printing is becoming more and more automated. However, the inspection of the final printed results of printing, that is, of the marks made by printing on printed paper, labels, packaging, and so forth, is still mostly manual.

Many different printing workflows are known. Some include making printing plates that are then used in a printing press to place colorant(s) onto a substrate to produce an instance of printed material. Examples of technologies that use printing plates include flexography and offset printing. Other printing processes such as gravure printing use engraved cylinders instead of plates. Some printing workflows print directly from electronic data. Examples include laser printers and inkjet printers.

Many printing workflows include finishing or converting operations following the application of the marks on the substrate. Examples of finishing include the application of a varnish or lacquer, hot or cold metal foil application and embossing. Examples of converting include trimming and die cutting. Unless otherwise indicated or clear from the context, such finishing and converting operations are included within the scope of the terms "printing" and "printing workflow."

Printing workflows typically include a prepress workflow and a printing stage. The prepress workflow is more and more computerized, and uses, for example, a page description language (PDL), such as PDF by Adobe Systems of San Jose, Calif. USA, or Open XML Paper Specification (also referred to as OpenXPS), an open specification for a PDL and a fixed-document format originally developed by Microsoft Corporation, of Redmond, Wash. as XML Paper Specification (XPS), later standardized by ECMA International as international standard ECMA-388, XML, and many other PDLs useful for describing printed pages.

As defined herein, a printing job may include what herein is called process data: information that defines the production setup and workflow, in terms of the actions (process steps) and software or equipment settings (process parameters) required to produce the printed material. Process data may include one or more files in a job description language, e.g., Job Definition Format (JDF). JDF is a technical standard being developed by the graphic arts industry to facilitate cross-vendor workflow implementation to define process data. A job description language is also called a process language herein.

Note that in general, the approaches described in this BACKGROUND section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

DESCRIPTION OF EXAMPLE EMBODIMENTS

Figure 1:
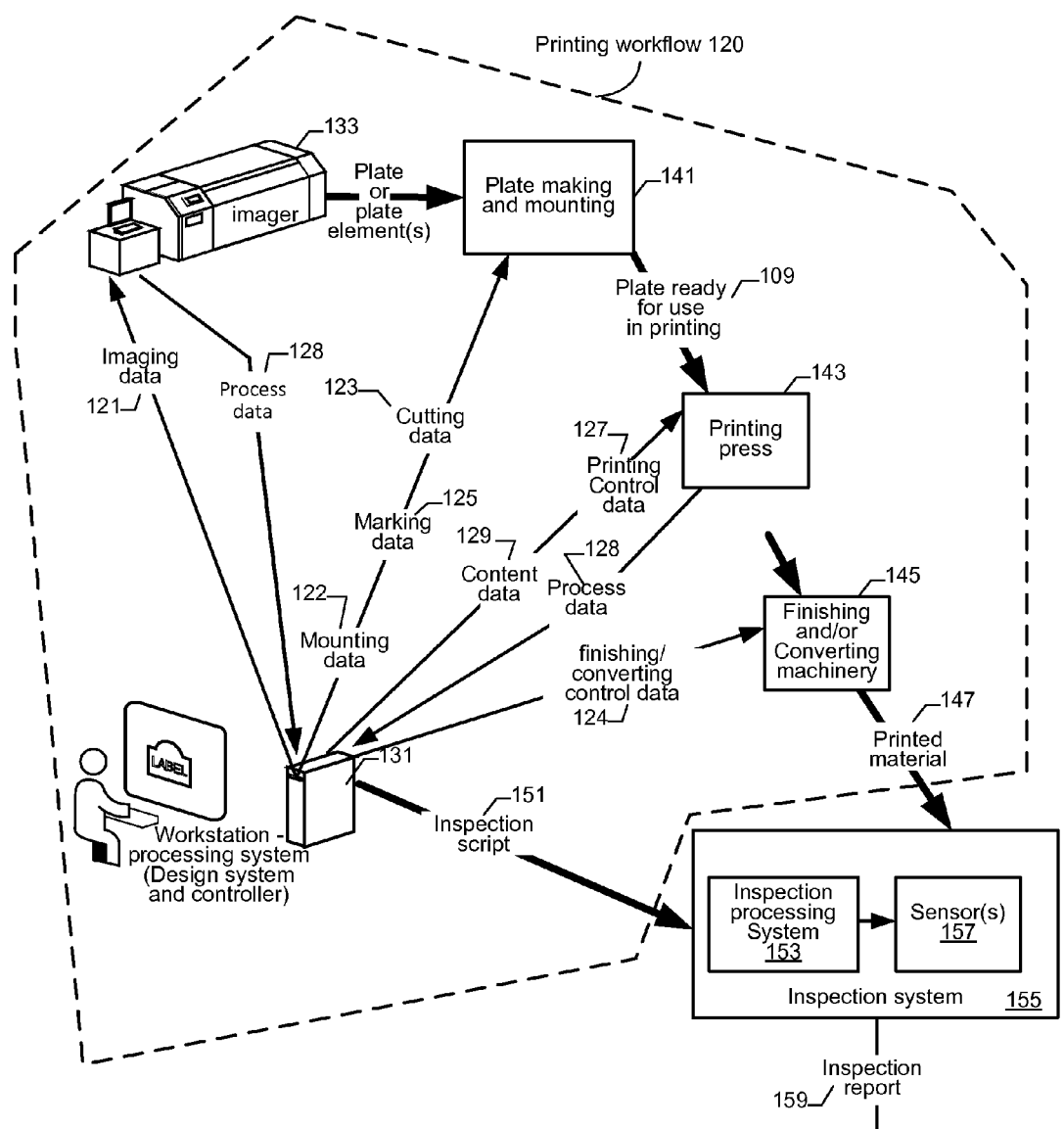
FIG. 1 shows one environment that includes elements of an example printing workflow according to an embodiment of the present invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be used without departing from the principles described herein.
Overview Embodiments of the present invention include a method, an apparatus, a system, and logic encoded in one or more computer-readable tangible media to carry out a method. The method in some versions forms a script that is usable by an inspection system for inspecting printed material produced according to a printing workflow. The method in some versions inspects printed material produced according to a printing workflow, the inspecting including executing a script.

By a printing workflow is meant a set of elements including, in a non-limiting way, humans, machines, including one or more processing systems, tasks, and executable instructions (software) in tangible computer-readable media that when executed by one or more processing systems, cause carrying out steps of methods, such set of elements used to design and manufacture the printed material. In some embodiments, a printing workflow includes a prepress workflow that includes one or more prepress stages.

Particular embodiments include a machine-implemented method of planning inspection of printed material produced according to a printing workflow. The method comprises: automatically or semi-automatically generating inspection instructions using data used or produced during one or more stages of the printing workflow; and combining the generated inspection instructions to form an inspection script related to the printed material produced according to the printing workflow. The inspection script when the instructions are executed to causes for inspecting instances of the printed material produced according to the printing workflow. Each instance comprises a single or repeated printed pattern that includes content and layout. The inspection script comprises machine-executable instructions that when executed in a processing system coupled to or included in an inspection system for inspecting printed material produced according to the printing workflow, causes the inspection system to carry out one or more inspection tasks on instances of the printed material. The inspection system comprises one or more sensors, each sensor operative to perform one or more measurements on at least one section of instances of the printed material.

In some versions, the generating the script comprises generating inspection instructions that cause, when executed, carrying out certification, including producing a certificate that attests to how the printed material produced by a printing job according to the printing workflow conforms to one or more inspection requirements prescribed in the inspection script.

Particular embodiments include a machine-implemented method of inspecting printed material produced according to a printing workflow. The method comprises accepting in an inspection processing system an inspection script comprises machine-executable inspection instructions, the inspection processing system coupled to or in an inspection system. The method further includes executing the accepted instructions of the inspection script to cause the inspection system to carry out one or more inspection tasks on instances of the printed material produced according to the printing workflow, the tasks including performing measurements on at least one section of instances of the printed material to produce observed data, and using the observed data for inspecting the instances.

In some versions, the inspection system includes one or more sensors operative to perform one or more of the measurements on at least one section of instances of the printed material.

Particular embodiments include an inspection system for inspecting printed material produced according to a printing workflow. The inspection system comprises: an inspection processing system, including one or more processors and a storage subsystem, and one or more sensors coupled to the inspection processing system. The one or more sensors are operative to perform measurements on at least one section of the printed material, the measurements generating observed data from the printed material. The inspection processing system is operative to accept a script comprising machine-executable inspection instructions and to carry out the instructions in the script to cause the inspection system to carry out one or more inspection tasks on the printed material according to the observed data of the printed material.

In some versions, the one or more sensors include an illuminator and an image capture device.

In some versions the one or more sensors include at least one of: a sensor to measure densitometric information, a sensor to measure photometric information, and a sensor to measure colorimetric information.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Example Embodiments

Particular embodiments of the invention include a method of planning for inspection of printed material created according to a printing workflow. Particular embodiments of the invention further include a method of carrying out inspection tasks on printed material created according to a printing workflow, the inspection tasks defined by a script. Particular embodiments of the invention further include a method of creating an inspection script comprising inspection instructions that define inspection of printed material created according to a printing workflow. Particular embodiments of the invention further include a storage medium configured with instructions that when executed by one or more processors of a processing system, cause carrying out a method of planning for inspection of printed material created according to a printing workflow. Particular embodiments of the invention further include a storage medium configured with instructions that when executed by one or more processors of a processing system, cause carrying out inspection tasks on printed material created according to a printing workflow, the inspection tasks defined by a script. Particular embodiments of the invention further include a storage medium configured with instructions that when executed by one or more processors of a processing system, cause carrying out a method of creating an inspection script comprising inspection instructions that define inspection of printed material created according to a printing workflow.

FIG. 1 shows one environment that includes a printing workflow, and that includes an embodiment of the present invention. The printing workflow 120 is shown within the broken line. A printing workflow includes a set of elements including, in a non-limiting way, humans, machines, including one or more processing systems, tasks, and executable instructions (software) in tangible computer-readable media that when executed by one or more processing systems, cause carrying out steps of methods, such set of elements used to design and manufacture the printed material. If there are at least one human in the printing workflow, such one or more humans may be, without limitation, a purchaser, a graphic designer, a prepress operator, a printing technician, a press operator, and so forth. In the example printing workflow 120, a human operator, e.g., a graphic designer, prepress operator, or several designers operate a processing system 131, which can be a workstation, or a network of computers, or several computers at different points of time generating the desired output. This processing system 131 is called the "design system and controller" 131 herein, and carries out a design process to generate imaging data 121 according to a prepress workflow for printing according to the printing workflow 120. The prepress workflow includes prepress stages, and is part of the printing workflow. In some embodiments the imaging data 121 produced by the prepress workflow is usable directly by an imaging device that directly outputs printed material 147. Such imaging devices may use inkjet or lasers and toners, as is known to those skilled in the art. In the workflow shown in FIG. 1, the imaging data 121 is used by an imager 133 to produce, in some versions, a complete plate, in other versions, plate elements that are used by a plate making and mounting process 141 to generate a plate 109 ready for use in printing. In some workflows, the design process carried out on the design system and controller 131 according to the prepress workflow has access to process data 128, specifying reproduction characteristics inherent to the imaging process of an imager 133, a printing device 147 or any additional imaging process step included in a printing workflow 120; based on such process data 128 the design system and controller 131 modifies elements of the imaging data 121 or parameters of such elements to account or to compensate for such reproduction characteristics. In some workflows, the design process carried out on the design system and controller 131 according to the prepress workflow includes generating one or more of mounting data 122, marking data 125, and cutting data 123 to be used in the plate making and mounting process. In the example embodiment shown in FIG. 1, the plate 109 ready for use in printing and is used by a printing press 143 to produce printed material 147 according to the printing workflow 120. Some embodiments further include finishing and/or converting machinery 145.

One aspect of the invention is that at least some of the inspection instructions are generated by interactions with one or more participants in the printing workflow. A participant may be a human in the printing workflow, e.g., a purchaser, a graphic designer, a prepress operator, a printing technician, a press operator, or another human participant. A participant also may be a software agent—e.g., by instructions being executed by processor(s) of a processing system—in the printing workflow, e.g., in the prepress workflow and/or press processes. In one example embodiment, there are a number of software agents in the form of software agent instructions (agent software) in a tangible storage medium that are executed on a processor, each agent when executed having a with specific role or roles related to the printing workflow 120, with each software agent when executing using data used in and/or generated by a stage of the printing workflow. In one embodiment, planning the inspection includes placing software agents at one or more stages in the prepress workflow or printing plate manufacture process or processes. Such a software agent may be arranged, programmed, or otherwise configured to execute at any time in the printing process until the material is printed. Such an agent when executing provides inspection instructions that relate to its particular task in the printing workflow 120, and records such inspection instructions incrementally into an inspection script 151. Thus, in some embodiments, at least some of the inspection instructions are generated by interactions with one or more participants included in the printing workflow, the one or more participants including at least one software agent in the form of a set of software agent instructions that when executed carry out specific role or roles related to the printing workflow using data used in or generated by a stage of the printing workflow, and, if included, at least one human participant. Typically, but not necessarily, the inspection instructions are generated sequentially, in several stages of the prepress workflow. Thus, according to planning inspection embodiment of the present invention, an inspection script 151 related to a particular printing workflow 120 is produced.

Printing according to the printing workflow 120 produces printed material 147. After printing according to the printing workflow 120, the produced printed material 147 is inspected by an inspection system 155. An inspection system 155 includes a set of one or more inspection machines, and devices, e.g., one or more sensors 157 that perform measurements, e.g., observations on the printed material 147, including in some embodiments, optical observations. Thus, a typical inspection system 155 includes one or more sensors 157. One aspect of the invention is the inspection system 155 interpreting the inspection script 151, and performing the inspections tasks prescribed by inspection instructions in the inspections script 151. In some embodiment, the inspection system 155 reports the results of the inspection carried out by the inspection system 155 as an inspection report 159.

In some versions, the inspection system includes one or more sensors operative to perform one or more of the measurements on at least one section of instances of the printed material.

In one embodiment, the design system and controller 131 also determines printing control data 127 used to drive the printing press 143.

In some embodiments, the design system and controller 131 also determines finishing/converting control data 124 used to drive the finishing and/or converting machinery 145, e.g., tool-making machinery and the finishing and/or converting presses.

Some embodiments include variable printing according to variable data, e.g., a stream of variable data. The variable data stream may be generated algorithmically, e.g., using sequence numbers, and/or may be received from a data processing system as a result of data processing, and/or may be generated by one or more generating applications. In embodiments that include variable printing in the printing workflow 120, there is also content data 129 that includes or forms variable content that varies in the printed material 147 from instance to instance of the printed material 147. In some embodiments that include variable printing, some parameters of inspection tasks defined by inspection instructions are generated dynamically to cause the different instances of the printed material 147 to be inspected according to different criteria.

In some embodiments, the inspection system 155 includes or is coupled to an inspection processing system 153 that interprets the inspections script 151.

Figure 9:
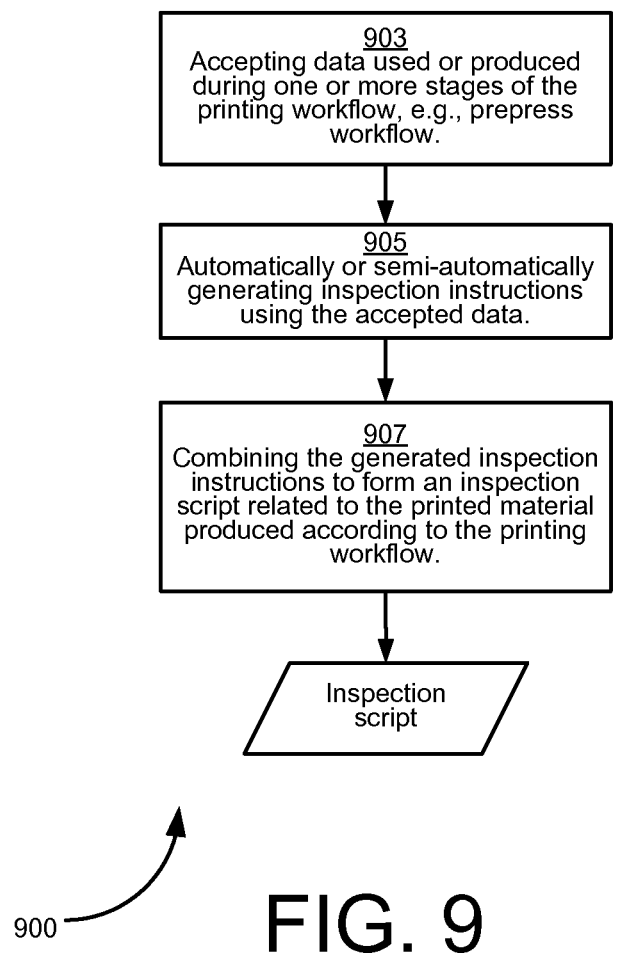
FIG. 9 shows a simplified flowchart of an embodiment of a method of planning inspection, according to aspects of the present invention.

Thus, one embodiment of the invention includes a machine implemented method of planning inspection by producing an inspection script 151 that can be executed by an inspection processing system 153 coupled to or that is part of the inspection system 155, that, when executed, causes carrying out inspection according to the inspection script 151. This method typically, but not necessarily is carried out during the prepress workflow part of the printing workflow. FIG. 9 shows a simplified flowchart of an embodiment of such a method of planning. The method comprises, in 903, accepting data used or produced during one or more stages of the printing workflow, in 905, automatically or semi-automatically generating inspection instructions using the data used or produced during one or more stages of the printing workflow 120, typically during one or more stages of the prepress workflow. The accepting and generating in one embodiment occurs incrementally as more and more stages of the prepress workflow are carried out. The method includes, in 907, combining the generated inspection instructions to form an inspection script related to the printed material 147 produced according to the printing workflow 120. The inspection script when the instructions are executed to causes for inspecting instances of the printed material produced according to the printing workflow. Each instance comprises a single or repeated printed pattern that includes content and layout. The inspection script comprises machine-executable instructions that when executed in a processing system coupled to or included in an inspection system for inspecting printed material produced according to the printing workflow, causes the inspection system to carry out one or more inspection tasks on instances of the printed material. The inspection system comprises one or more sensors, each sensor operative to perform one or more measurements on at least one section of instances of the printed material.

Figure 10:
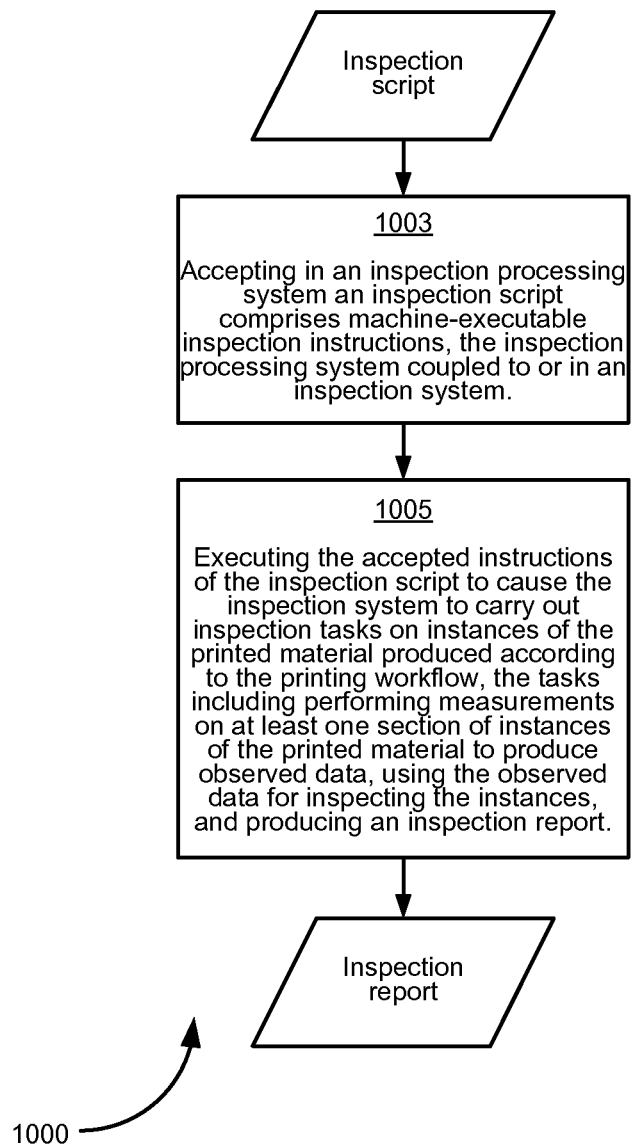
FIG. 10 shows a simplified flowchart of an embodiment of a method of carrying out inspection using an inspection script of machine-executable instructions generated by a method of planning, according to aspects of the present invention.

Another embodiment of the invention includes carrying out inspection according to an inspection script, e.g., carrying out the inspection according to the script 151. The inspection script 151 comprises inspection instructions, and provides a mechanism to define an inspection job that includes one or more inspections tasks. One aspect of the invention is that the one or more inspection tasks can include a large number of a large variety of inspection tasks. FIG. 10 shows a simplified flowchart of an embodiment of such a method 1000 of inspecting. The method comprises, in 1003 accepting in an inspection processing system an inspection script comprises machine-executable inspection instructions, the inspection processing system coupled to or in an inspection system. The inspection script, for example, is produced according to the method described in the flowchart of FIG. 9. The method further includes, in 1005, executing the accepted instructions of the inspection script to cause the inspection system to carry out one or more inspection tasks on instances of the printed material produced according to the printing workflow, the tasks including performing measurements on at least one section of instances of the printed material to produce observed data, and using the observed data for inspecting the instances. In some embodiments the inspection tasks include producing an inspection report.

Referring again to the environment of FIG. 1, some embodiments of the environment include a communication link between one or more computer-based devices in the environment and able to communicate with at least one of the participants, in order to support or perform the conversion of a particular participant's inspection requirements into an inspection script extension consistent with the existing script.

Some embodiments of the environment include a communication link to an information processing system of a printing workshop, in order to coordinate data exchanges in the various stages of a printing job using the printing workflow, including one or more of: generation of the script, execution of inspection by the inspection system, and collection of results.

In some embodiments, one or more parts of the inspection script 151 are embedded within or associated with process data, e.g., one or more computer files that describe the corresponding printing job according to the printing workflow. In one embodiment, the computer files a description language such as a page description language or a job description language. In some embodiments, inspection results are associated with the process data, e.g., the one or more computer files that describe a printing job according to the printing workflow.

It should be clear to one skilled in the art that other workflows include more or fewer of the elements of workflow 120 shown in FIG. 1, and that embodiments of the present invention work with such other printing workflows.

By a machine is meant a processing system. The methods described herein are carried out by a processing system comprising one or more processors and a storage subsystem. The storage subsystem includes memory and may include one or more other forms of storage. The storage subsystem forms a tangible storage medium, and has stored therein instructions that when executed by one or more of the processors of the processing system, cause carrying out of embodiments of the methods described herein.

Figure 2A:
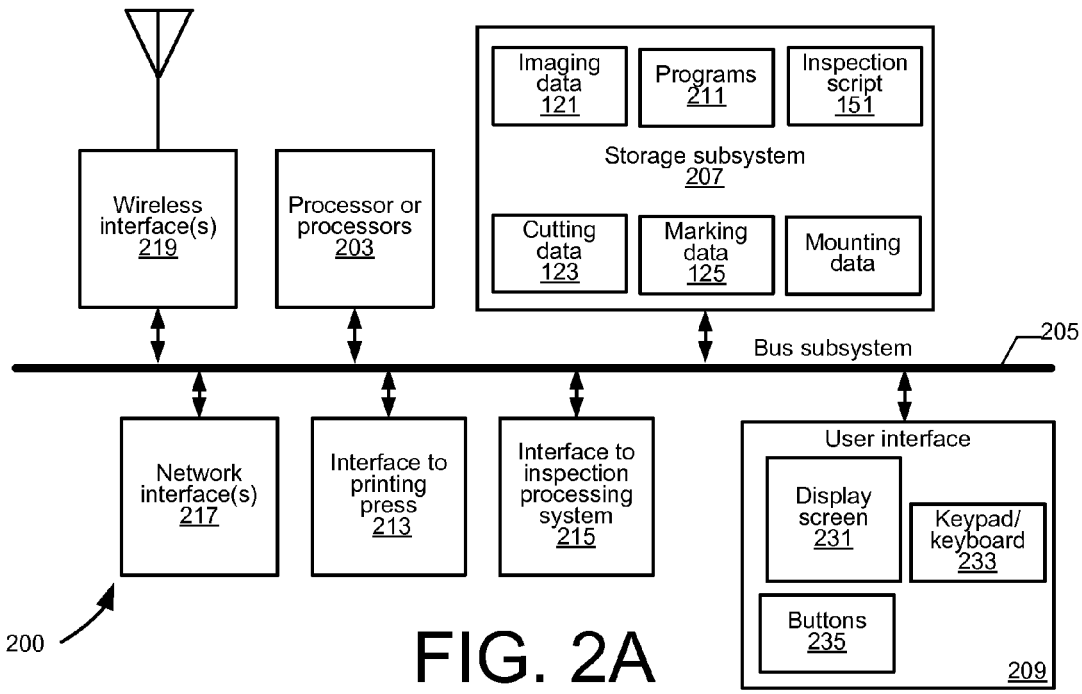
FIG. 2A shows one example of a processing system that carries out one method embodiment of the present invention of creating at least part of an inspection script of the present invention.

FIG. 2A shows one example of a processing system 200 that can be used as a part of the design system and controller 131 of FIG. 1 that carries out the prepress workflow and that generates the inspection script 151. In the example embodiment, this is part of the processing system 131 that generates at least part of the document data. The processing system includes one or more processors 203. Each processor may include one or more of a CPU or similar element, a graphics processing unit (GPU), and/or a programmable DSP unit. The processing system further includes a storage subsystem 207 with at least one storage medium, which may include memory embedded in a semiconductor device, or a separate memory subsystem including main RAM and/or static RAM, and/or ROM, and also cache memory. The storage subsystem may further include one or more other storage devices, such as magnetic and/or optical and/or further solid state storage devices. A bus subsystem 205 may be included for communicating between the components. Although typically complex, the bus subsystem is shown in FIG. 2A as a single bus. The processing system 250 further may be a distributed processing system with processors coupled by a network, e.g., via network interface 217 or wireless network interface 219. The processing system that creates (at least part of the script) may therefore comprise a plurality of processing systems, e.g., interconnected by a network, or even separate processing systems that may operate at different points in time in the printing workflow, and that include agents that create at least part of the inspection script 151.

In one version, the processing system 200 includes a user interface 209 that in one embodiment includes a display screen 231, a keyboard 233, and a pointing device (not shown). In one embodiment, the user interface includes buttons 235, either in hardware form, as a so-called soft buttons that are displayed on the display screen and can be interacted with by a user. The display screen may be, e.g., a liquid crystal display (LCD), organic light emitting display (OLED), or a cathode ray tube (CRT) display. The term storage device, storage subsystem, or memory unit as used herein, if clear from the context and unless explicitly stated otherwise, also encompasses a storage system such as a disk drive unit.

The storage subsystem thus includes a tangible computer-readable medium that is configured with, e.g., encoded with instructions, e.g., logic, e.g., software programs 211 that when executed by one or more of the processors, causes carrying out one of more of the method steps of method embodiments described herein. The software may reside in the hard disk, or may also reside, completely or at least partially, within the RAM and/or within the processor during execution thereof by the computer system. Thus, the memory and the storage elements with the processor also constitute computer-readable medium on which are encoded instructions.

The system 200 in one embodiment is coupled via an interface 213 to the printing press 143. While in some embodiments, the interfacing to the printing press 143 is via the network interface 217, a separate interface 213 is shown in FIG. 1. Furthermore, in some embodiments there is no direct connection to the printing press.

The system 200 in one embodiment is coupled via an interface 215 to the inspection system 155, e.g., to the inspection processing system 153 coupled to or in the inspection system 155. While in some embodiments, the interfacing to the inspection system is via the network interface 217, a separate interface 215 is shown in FIG. 1. Furthermore, in some embodiments there is no direct connection to the inspection system. The inspection script, may, for example be stored in a movable storage medium and transferred at some later time to the inspection processing system 153.

Storage system 207 is shown including at least some of imaging data 121, cutting data 123, marking data 125, mounting data 122, the generated inspection script 151, and the software programs 211 which include instructions to carry out at least some of the methods described herein. In one embodiment, one or more agents are implemented as part of the software programs 211.

Figure 2B:
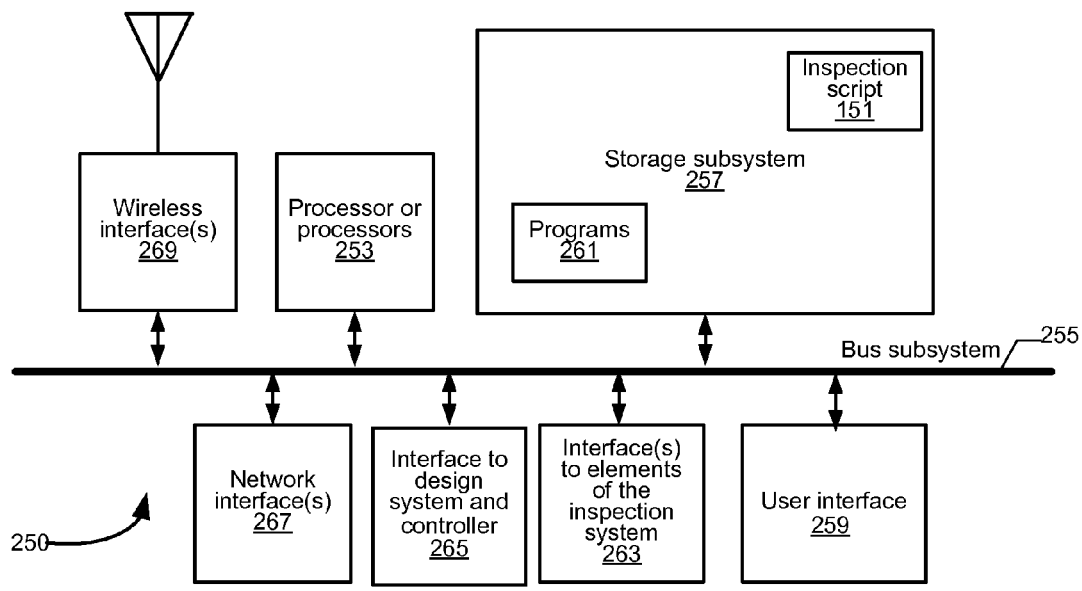
FIG. 2B shows one example of an inspection processing system coupled to or included in an inspection system that carries out one embodiment of the present invention of inspecting printed material according to an inspection script.

FIG. 2B shows one example of a processing system 250 that can be used as the inspection processing system 153 of FIG. 1 that is coupled to or included in the inspection system 155. The processing system includes one or more processors 253. Each processor may include one or more of a CPU or similar element, a graphics processing unit (GPU), and/or a programmable DSP unit. The processing system further includes a storage subsystem 257 with at least one storage medium, which may include memory embedded in a semiconductor device, or a separate memory subsystem including main RAM and/or static RAM, and/or ROM, and also cache memory. The storage subsystem may further include one or more other storage devices, such as magnetic and/or optical and/or further solid state storage devices. A bus subsystem 255 may be included for communicating between the components. Although typically complex, the bus subsystem is shown in FIG. 2B as a single bus. The processing system further may be a distributed processing system with processors coupled by a network, e.g., via network interface 267 or wireless network interface 269. The processing system includes a user interface 259.

The storage subsystem 257 thus includes a tangible computer-readable medium that is configured with, e.g., encoded with instructions, e.g., logic, e.g., software programs 261 that when executed by one or more of the processors, causes carrying out one of more of the method steps described herein. The software may reside in the hard disk, or may also reside, completely or at least partially, within the RAM and/or within the processor during execution thereof by the computer system. Thus, the memory and the storage elements with the processor also constitute computer-readable medium on which are encoded instructions.

The processing system 250 in some embodiments further includes an interfaces 265 to a design processing system, e.g., processing system 200. The processing system 250 in some embodiments further includes one or more interfaces 263 to elements in the inspection system 155. While interfaces 263 and 265 can be the network interface or interfaces 267, separate interfaces are shown in FIG. 2B. Furthermore, as discussed above in the description of FIG. 1, the transmission of the inspection script 151 need not be by direct or network connection, but can be by transfer of the script 151 via a storage medium.

Also shown in the storage subsystem 257 is the inspection script 151 that when executed by one or more of the processors cause an inspection system to carry out inspection tasks.

Note that while any of the diagrams may only show a single processor and a single storage subsystem, e.g., a single memory that stores the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Data Flow

Figure 3:
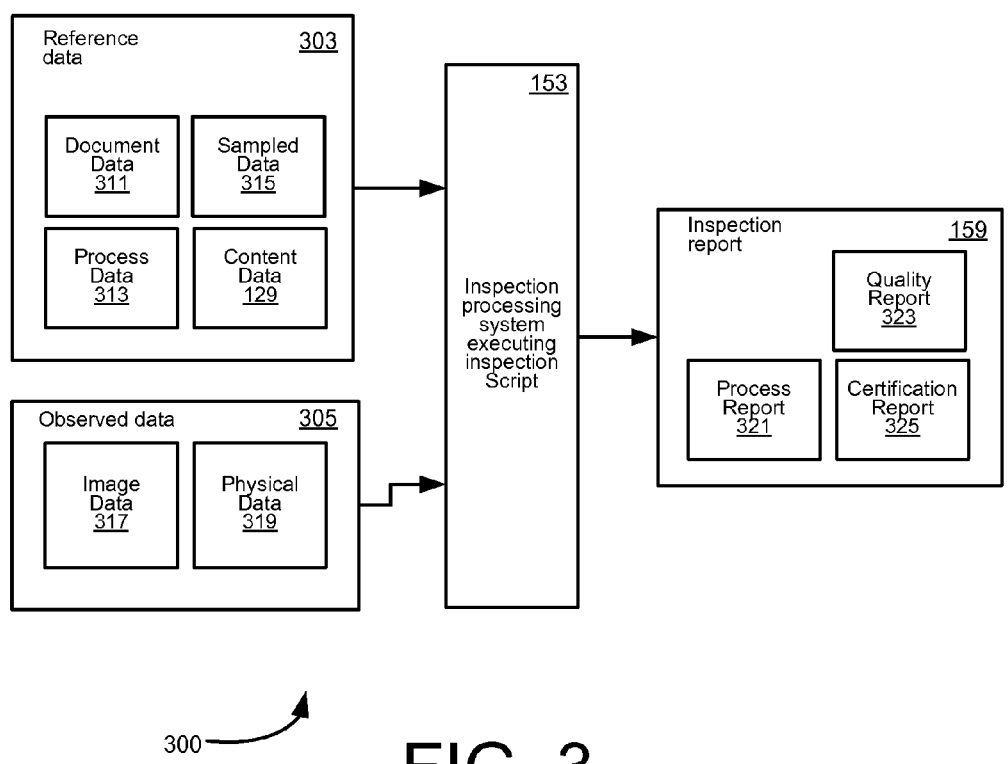
FIG. 3 illustrates a dataflow for embodiments of the invention that include producing an inspection script and that include an inspection processing system executing the inspection script to carry out one or more inspection tasks.

The inspection script 151 can be considered as a program that when executing operates on input data to produce output data. FIG. 3 illustrates a dataflow 300 for embodiments of the invention that include producing the inspection script 151 and that include the inspection processing system 153 executing the inspection script 151 to carry out inspection tasks using observed data.

The inspection script 151 describes the inspection of instances of the printed material 147, e.g., of a single or repeated printed pattern, e.g. a page, of known intended content and layout, produced in the course of a printing job that follows the printing workflow.

Reference data 303 represents the characteristics that any instance of the printed material 147 has to comply with. These data are assembled from various data repositories used throughout the workflow. Machine-executable inspection instructions included within the inspection script reflect and depend on characteristics of one or more image reproduction processes defined or that occur during the printing workflow.

In some embodiments, the reference data 303 includes one or more of:

Document data 311 including data elements used to eventually drive the printing press 143. Such data includes the design data, e.g., the document features, such as layout, text, graphics, font, pictures, and so forth. In the embodiment shown in FIG. 1, document data includes the design files that are used to produce imaging data 121 used by an imager 133 to produce a plate or plate element(s).

Process data 313, as used by the machinery that handles the material before, during and after printing. In the embodiment shown in FIG. 1, this includes any cutting data 123, marking data 125 and mounting data 122 used in the plate making and mounting process to produce a plate 109 ready for use in printing from the plate or plate elements. In one embodiment, the process data further include printing control data 127 used to drive a printing press 143. In embodiments that include finishing and/or converting operations in the printing workflow, process data 313 may include finishing/converting control data 124 used in such printing workflows to control the finishing and/or converting machinery 145.

Content data 129, which describes special parts of the document, not necessarily described in the document data. An example is variable content, such as identification marks or text that varies from instance to instance of the printed material 147. This is also shown as content data 129 in FIG. 1.

Sampled data 315, comprising one or more instances of observed data 305, or derivatives thereof, acquired during or after previous production runs based on the printed material 147 resulting from such production runs according to an identical, similar or entirely different printing workflow. This is applicable to inspection methods based in part or as a whole on sampling a "golden master." For example, in one version, sampled data 315 includes measurements made on or characteristics of a predefined "perfect" product, called the golden master.

Note that the reference data 303 used by the inspection method may be a subset of all data involved in the printing workflow 120. Note further that inspection data may contain additional information that is not directly relevant to the printing workflow.

Figure 4:
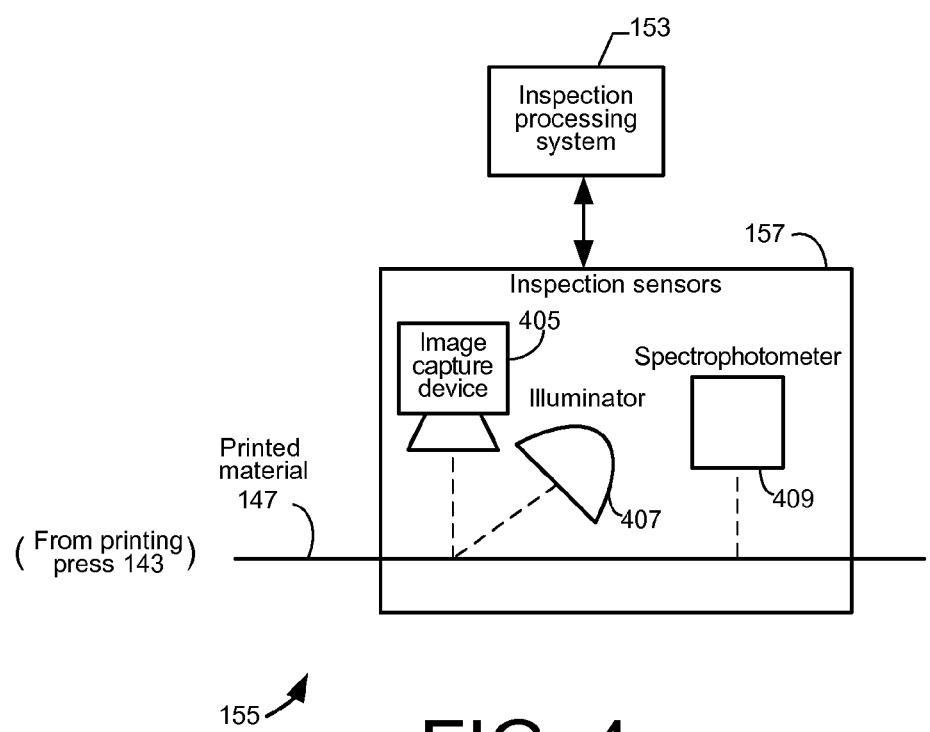
FIG. 4 shows one example embodiment of an inspection processing system according to an embodiment of the present invention.

FIG. 4 shows one example embodiment of the inspection system 155 including the inspection processing system 153 and the one or more inspection sensors 157. In one embodiment, the one or more sensors include an image capture device 405, e.g., a line scan camera capturing data line-by-line, and/or an image camera capturing a two-dimensional image of at least one section of some or all instances of the printed material. One embodiment includes an illuminator to illuminate the printed material 147 being inspected to provide a sufficiently illuminated view to the camera 405. In one embodiment, the one or more sensors include color measuring instrument, such as at least one of a densitometer, colorimeter, and spectrophotometer, which enables color measurement on the printed material 147 being inspected. FIG. 4 shows a spectrophotometer, and embodiments of the invention are not limited to spectrometric color measurement. Furthermore, other sensors can be considered as well, such as one or more dimensional sensors (not shown in FIG. 4).

Note that in some embodiments, the instructions provide for the case that not all instances of the printed material are inspected.

Some embodiments of the inspection system further include a calibration module that is operative to calibrate at least one of the one or more sensors, e.g., operative to carry out at least one of densitometric calibration, photometric calibration, and colorimetric calibration of one or more sensors respectively used to measure densitometric information, photometric calibration, and colorimetric calibration, respectively. The calibration module comprises non-transitory medium with instructions that cause the inspection processing system 153 to carry out measurements and calibration. Thus, one embodiment is a machine implemented method that includes calibrating at least one of the one or more sensors.

By observed data 305 is meant data elements retrieved from one or more instances of the printed material 147 produced through the one or more sensors 157 of the inspection system 155. In one embodiment, the inspection system 155 includes the image capture 405 device that reports a digital image of the printed material 147, in one version as an array of pixels. This is shown in FIG. 3 as image data 317. In some embodiments, observed data includes physical data 319, in which case the inspection system includes a sensor that performs measurements of one or more physical characteristics on at least one section of instances of the printed material.

Inspecting an instance of printed material 147 includes interpreting the observed data 305 to extract relevant information that can be analyzed relative to the reference data 303. A particular inspection task involves the selection of one or more particular reference data elements considered as a target, and a particular processing method to report, e.g., quantitatively how the observed data elements of observed data 305 match or mismatch the target.

One embodiment of carrying out inspection thus includes accepting and analysing data from at least one of the one or more sensors, and reporting results that qualify the conformance of specified aspects of at least one section of an instance or instances of the printed material to specified criteria with specified tolerances. Furthermore, one embodiment of the inspection system thus includes an analysis module that accepts the observed data 305, applies to the accepted measurements inspection instructions according to the script, and reports results that qualify the conformance of the specified aspects of at least one section of an instance or instances of the printed material to specified criteria with specified tolerances.

A complete inspection pass performs several inspection tasks targeting various intents. The result of a complete inspection pass is the inspection report 159.

As shown in FIG. 3, in one embodiment, the inspection report 159 includes a plurality of reports, including one or more of:

A quality report 323 that provides an evaluation of selectable printing features, such as ink densities, color fidelity, sharpness, position and dimension of objects, as so forth . . . .

A process report 321 resulting from inspection tasks designed to evaluate the performance of various components of the printing machinery (which in some embodiments include finishing and/or converting machinery), e.g., the elements shown in FIG. 1 that are in the printing workflow.

A certification report 325, which is a compilation of the inspection results that assesses how the printing job complies with its target specification. Thus, in some embodiments, results of inspection carried out by the inspection system according to the inspection script are used for certification, e.g., by incorporating the results or a function thereof in a certificate that attests how the printed material produced by a printing job according to the printing workflow conforms to one or more inspection requirements prescribed in the inspection script, such that the script can be considered to include a target quality specification.

The Inspecting Tasks and Associated Inspection Script Elements

One aspect of the invention is creating the inspection script that defines inspection tasks. One aspect is a formal mechanism, e.g., use of a formally-defined language (the "inspection language") to define inspecting tasks that form the components of an inspection job. In one embodiment, the inspection script 151 is an organized assembly of inspection instructions that follow a language syntax. Each instruction defines a task. Such an instruction may address conformance of one or more aspects of the printed material to one or more criteria, e.g., with various tolerances, so that at least some of the inspection instructions address conformance of an specified aspect of the printed material to one or more specified criteria, at least one criterion having a defined tolerance. In some embodiments, the language further includes instructions to accommodate variable printing, i.e., printing jobs with variable content, according to which one or more printed elements on a page vary from printed instance to instance, such that the instructions might be generated dynamically to cause the different instances to be inspected.

The language includes syntax elements for the tasks. Examples of tasks and of elements of instructions in the inspection script are now described.

In one version, <geometry defined here> describes the geometry (by "defined here") of a printed object. In one version, <color defined here> defines the color according to the "defined here" element of a printed object having <geometry this is a geometry>, where "this is a geometry" is the description of the geometry, in a printed page of the printed material 147. One task is inspecting the color of the object for deviation from an expected color target value<color this is a color spec>, where "this is a color spec" is the defined color, e.g., under particular illumination.

Discrepancies are evaluated according to a method defined by a script element <matching rule defined here>, where "defined here" defines a rule that defines how to quantify discrepancies, e.g., shortcomings, deficiencies, deviations, and so forth, using prescribed tolerances.

<report layout defined here>, where "defined here" is a layout description, and defines the layout of a report into which one of the results of the inspection are be inserted.

As an example, suppose there is a barcode as a printing element. The printed pattern <geometry barcode geometry> is a barcode <content barcode content>, where "barcode content" is the barcode content, that should be exact as per <matching rule barcode matching rule>.

In addition, to continue with the example, readability of the barcode can be measured using <acceptance rule defined here>, where "defined here" defines a particular acceptance rule for readability. The result of the inspection is inserted in a report using <report layout barcode report layout>.

The characters in the area <geometry defined here> typically are to be printed with a correct stroke, neither too thin nor too wide, as defined in <matching rule defined here>.

The result of the inspection will be inserted in the report using <report layout defined here>.

The above example shows how to express a large variety of inspection tasks with a small amount of primitive concepts.

Inspection instructions in one embodiment are partitioned into:

Instructions that deal with how to measure, calculate, express, weigh, and so forth, various discrepancies of quantities, as specified by the inspection language Instructions that deal with report selection and/or formatting options. These are typically not job dependent but driven by the environment, although one particular customer may request particular type of report for all of its jobs produced.

Modeling Inspection Instructions

Figure 5:
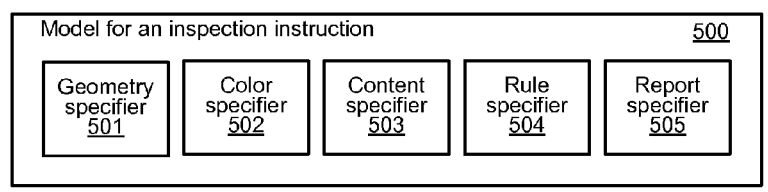
FIG. 5 shows the elements of an inspection instruction according to one embodiment of the invention that includes a plurality of specifiers for a plurality of categories.

FIG. 5 shows the elements of an inspection instruction according to one embodiment of the invention, and that includes a plurality of specifiers for a plurality of categories. A specifier is a set of valued parameters. One embodiment of the language defines a geometry specifier 501, a color specifier 502, a content specifier 503, a rule specifier 504, and a report specifier 504. Other embodiments may include more or fewer specifiers for more or fewer categories.

In one embodiment the inspection instructions that make up an inspection script are in the formally-defined inspection language, described by the inspection-language syntax, i.e., they follow the inspection-language syntax.

The parameters defined in each category refer each other in order to constitute a tractable inspection instruction.

In one embodiment, the language includes high-level instructions that inherently may include built-in composite pattern low level instructions, in such a way that groups of instructions are treated in the same way as a basic instruction. For more on composite patterns, see the Wikipedia Web entry ad "en~dot~wikipedia~dot~org/wiki/Composite_pattern", retrieved 2011 Dec. 5, where ~dot~ represents the period (".") in the actual URL.

Specifiers of an Inspection Instruction
Geometry Specifier 501

The geometry specifier 501 deals with "where to inspect." The inspected area is that part of the printed material 147 that essentially repeats itself in the course of the printing job. According to the printing job specifics, it is a page, an imposition, a set of contiguous labels, and so forth. Let us call this two-dimensional space the printed pattern.

In practice, almost every inspection task addresses some geometrically defined sub-part of a printed pattern. Such a sub-part can be simply a rectangular area, or a complex shape, or a set thereof.

In one embodiment the geometry specifier uses a graphic language to specify the locations where the corresponding inspection is required to take place. In one embodiment, the elements of page to be printed are defined by a Page Description Language (PDL), such as POSTSCRIPT® or PDF, both by Adobe Systems, of San Jose, Calif., USA. In such a language, there is also a geometric specifier for each object. In one aspect of the invention, the objects to be inspected are also defined by a language that includes a definition of where it is on the page.

In one embodiment, the inspection instructions link to an object in the PDL file. Such a linking is by the object's ID. The PDL file when processed provides a location of that object. Thus, one aspect of the invention is, in addition using a language, e.g., a PDL to define how to mark an object by printing, creating and/or using inspection instructions that describe where (and how) to perform inspection.

In another embodiment, the SVG (Scalable Vector Graphics) language is used to define location in the inspection script. For more on SVG, see the Web at "en~dot~wikipedia~dot~org/wiki/Svg", retrieved 2011 Dec. 5, where ~dot~ denotes the "." in the actual URL.

In SVG, the graphics is defined as a composite arrangement of primitives such as path, shape and text. The geometry of these primitives is defined with high accuracy, using vector graphics, not pixel graphics. This expresses in a generic and neutral way any geometric object, simple or complex, where we want a particular inspection to happen.

As an example, consider the following fundamental objects that are commonly defined in vector graphics languages such as SVG: shapes, paths (or contours), and glyphs (or characters). Through examples, we show how the inspection model uses those objects.

Note that in some PDLs, e.g., in PDF, paths are used to define shapes. In other PDLs, paths and shapes may be separately and differently defined.

When marking or painting according to a graphic language, a painting method is applied to a shape. One aspect of the invention is that an inspection model uses the shape object to define how a printed pattern should comply with a prescribed content and other attributes. This prescription can be one or more of a uniform color, a mathematically defined spread of colors, a picture, a symbol, a stroke width and color, and so forth.

Instead of applying a drawing method to a path with some pen, as occurs when a graphics language is used to mark or paint, the inspection model uses the path object to indicate the limits between differently colored regions where a prescribed color transition is required. This prescription relates to one or more of sharpness, trapping, exactness of location, and so forth.

Instead of applying a drawing method to draw a glyph according to a font system, the inspection model uses the glyph information to locate the text elements in the printed pattern submitted to inspection. This inspection may involve reading the text to one of more of: guarantee the content, assess the printing or reading quality, check size, check font, check integrity, check spacing, and so forth.

According to one embodiment of the invention, some instructions in the inspection language include a plurality of geometry specifiers. For each particular inspection instruction, there is one instance of the graphic language that explains exactly to what object this inspection is applied. In one version, a single geometry specifier is not intended to address all parts of the printed pattern. Rather, for each instance of an inspection instruction, a corresponding geometry specifier is provided, with just the required extent. One embodiment of the language enables specifying inspection target values by "type", "class" etc. of objects, not only for a single specific instance thereof.

Color Specifier 502

The color specifier 502 collects parameters to define the color or set of colors involved in a particular inspection. Well-accepted mechanisms for specifying color are known and used in embodiments of the present invention.

In one embodiment, the color specifier 502 uses a representation of color according to which it is possible to express the discrepancy between two colors in term of a distance. There are many color spaces known in the art that provide for such description of color difference. One example of such a color space is the L*a*b* color space.

One embodiment provides for comparing the color specified by the color specifier 502 and the color reported by the inspection system 155. One embodiment further assigns a grade to the discrepancies.

Assume the L*a*b* color space is used, and the invention can operate additionally or instead with one or more other device independent or device dependent color spaces. Thus, in other implementations, other mechanisms for specifying color are instead or additionally provided, and useful for some applications. For example, for spot color printing in packaging, the specification may be in terms of the ink density of a specific spot ink. In other cases, a set of ink densities and/or dot % values may be specified. The invention is not limited to any particular way of specifying color, and the inventors are aware that in the printing industry, color is often specified in terms of specific colorants, rather than as a color in some device-independent color space. Hence, one embodiment of the invention provides for more than one way of specifying color. It is known how to convert back and forth between a device specific, e.g., colorant specific color specification and that same color in a device independent color space such as L*a*b*. One example is by use of device profiles, and transformation engines that use such device profiles. There are even standards for such specification. See for example, the International Color Consortium (ICC) and how device profiles are defined. See, e.g., the Web entry en~dot~wikipedia~dot~org/wiki/International_Color_Consortium, retrieved 2011 Dec. 5, where ~dot~ denotes the "." in the actual URL.

Content Specifier 503

The content specifier 503 deals with "what to inspect." by defining information that is expected in a region, e.g., a region defined by a geometry specifier 501. The content specifier 503 hosts a set of data that could be used to render the prescribed content in the prescribed region.

Examples of content specifier 503 include, but are not limited to, one or more of:
- For a region of uniform color, the content specifier 503 assigns a particular color (from a color specifier 502) to a particular region (from a geometry specifier 501).
- A region with non-uniform color uses a mathematical equation defined in the content specifier 503, mapping a color distribution to a region. The color and geometric parameters are taken out of corresponding specifiers.
- A picture is assigned to a region with a content specifier 503 that declares the file containing the picture, taking care of color management information associated to the picture.
- A symbol, such as a barcode or a QR-code, is defined by an appropriate set of data designated by the content specifier 503.
- A text that may be shared with the text object defined in the geometry specifier 501.

Note that those regions of the substrate that do not have colorant applied, in some embodiments, may also be the subject of an inspection instruction, for example, to ensure the absence of any printing marks or any other undesired visible defect in such regions.

This list is for the sake of explanation. The model is designed in such a way that other content varieties can be defined in a content specifier 503. This provides extensibility. For example, in those embodiments in which the printing workflow includes one or more of finishing and converting, there may also be, for example, areas, shapes, and so forth, to be covered by a varnish, there may be paths to be used for embossing or cutting, and so forth. Thus, in some embodiments, the language is adaptable and extensible to represent the inspection requirements of any participant, either as one combined specification or through progressive enrichment or amendment of the previous defined inspection instructions.

Rule Specifier 504

The rule specifier 504 deals with "how to inspect." An inspection system operating according to aspects of the present invention inspection, and in some versions, certification. The purpose of the inspection system is to determine for the printed material 147:
- Is the printed material 147 fit for its intended application, e.g. free of any significant aesthetic or other defect?
- What is the nature of any discrepancy, such that one further the goals of identifying the underlying cause, adjusting process parameters and/or diagnosing malfunctions?

Based on the "where" and "what" information found in the geometry and content specifier 503s, the rule specifier 504 in one embodiment supports several inspection schemes. By design, these schemes have provisions to account for tolerances, and report the inspection in the form of numeric results, not a mere pass/fail conclusion.

One representative example of an inspection rule can be defined in a rule specifier 504 is a matching rule that describes a comparison between the content acquired from a real printed pattern in the printer material, and the reference content defined in the specifiers. In one embodiment, the matching rule reports statistics on similarities or discrepancies. In one embodiment, the rule specifier 504 for the matching rule states which statistics are computed, and the parameters of this computation.

As an example, consider a matching rule addressing a shape containing a mathematically defined color spread (possibly a constant color). In one embodiment, the comparison involves probing a defined area. The defined area is (programmatically, not necessarily physically) scanned over all locations in the area's shape. In one embodiment, the probing reports the degree of color mismatch, integrated over the defined area. In one embodiment, the size of the probe is a parameter of the rule.

With a small probe area, in one embodiment, such a rule reports mismatching spots of equally small size. An included (in the script) inspection task when executed provides for the inspection system to detect stains or other printing artifacts. With a large probe area, in one embodiment, such a rule reports large scale deviations over the shape, such as patches or mottles. In one embodiment, if instructed so, the inspection task also reports the number of spots, their locations and their individual level of mismatch, in addition to a global mismatch level.

The rule specifier 504 may determine the application of several rules with distinct parameters, for example to detect and report large and small spots in a shape.

The general idea is that any inspection rule, as the variable-size probe-based comparator outlined above, has the following properties:
1) A physical meaning close to the preoccupations of the printing profession,
2) An effect backed by a prescribed algorithm, which in one embodiment, is a relatively simple algorithm, e.g., one involving less than ten steps.

The first property makes it possible to model an inspection requirement from any agent in the workflow. The second property enables the independence of the process from any specific physical inspection device. The prescribed algorithm becomes a functional specification of the inspection system 155.

In one embodiment, an inspection rule reports a level of seriousness of the mismatch. This level is computed through a process using tolerance parameters to adjust the sensitivity to the measured discrepancies. The seriousness reported by each individual rule in a particular inspection instruction can be consolidated as a single mismatch figure.

In addition to the above shape matching rule, some embodiments of the invention include, in the language for inspection scripts, one or more additional inspection rules.

Some embodiments include a path matching rule to report how well the boundary between two colored regions matches the reference defined in the path objects of a geometry specifier 501. Such a path matching rule may have variants that favor the accuracy of the boundary in term of location or color transition sharpness.

Some embodiments include a glyph matching rule to reports how well a text zone acquired by the inspection system 155 matches the glyphs defined in a geometry specifier 501.

Some embodiments include a picture matching rule to report how well an image acquired by the inspection system 155 matches the image defined in a content specifier 503.

Some embodiments include a symbol matching rule to read an identification symbol and compare it to the data of a content specifier 503.

Some embodiments include a text matching rule to read a text zone and compare it to the data of a content specifier 503.

Some embodiments of the invention also include a set of what we call acceptance rules. Some printed elements can be inspected against a known quality standard, and not against a reference description. This is the case for barcode and data-matrix codes. More information is available in the international standards: ISO/IEC 15426-1 titled "Automatic identification and data capture techniques—Bar code verifier conformance specification—Part 2: linear symbols" and ISO/IEC 15426 1 & 2 titled "Information technology—Automatic identification and data capture techniques—Bar code verifier conformance specification—Part 2: Two-dimensional symbols."

Report Specifier 504

The report specifier 504 includes all parameters that organize the output of results provided by the execution of the inspection rules.

Besides formatting instruction, the report specifier 504 may prescribe a statistical treatment of some or all measurements obtained after the inspection of a complete printing job.

Generating the Inspection Script

Embodiments of the invention include a method of planning inspection of printed material 147 created according to a printing job of a workflow 120, and includes generating an inspection script 151 that is appropriate, e.g., designed for the particular printing job that operated according to the printing workflow 120. According to an aspect the invention, at least part of an inspection script 151 can be generated progressively by one or several agents in the printing workflow.

Figure 6:
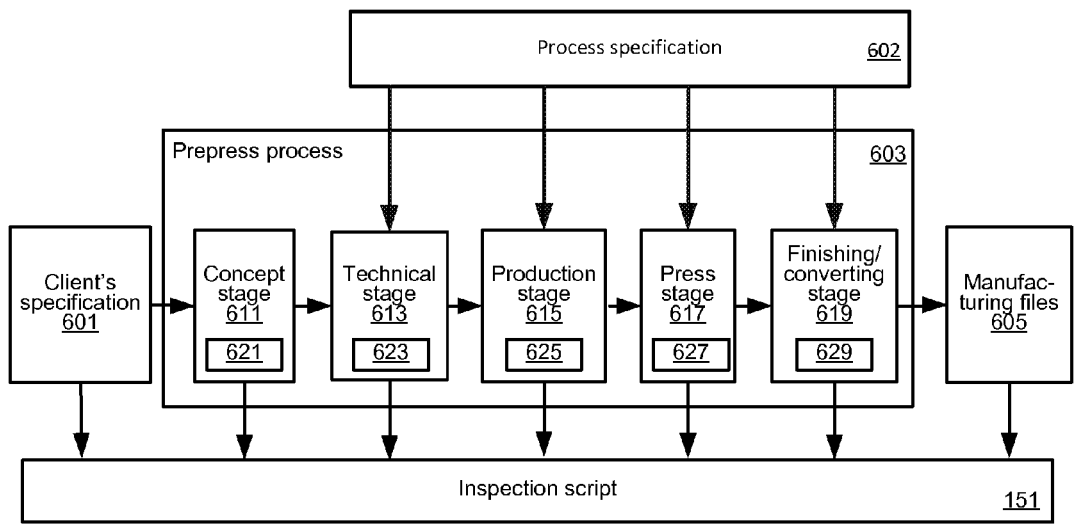
FIG. 6 shows one embodiment of a process of generating an inspection script.

FIG. 6 shows one embodiment of the process of generating an inspection script 151 according to a prepress process of a printing process. In FIG. 6, a prepress workflow included in the printing workflow is shown, starting from the client's specification 601 that in some embodiments includes data presented in one or more files in a PDL, e.g., in Adobe PDF. A prepress process 603 includes one or more of a concept stage 611, a technical stage 613, a production stage 615, and a press stage 617, and in some embodiments, a finishing/converting stage 619. In some embodiments, these stages take into account process data 128, collectively forming a process specification 602. In the embodiment shown, the final product is a set of manufacturing files 605 driving a printing press any finishing and converting machinery that follows printing.

When computerized, in one embodiment, the prepress process 603 operates with the aid of a processing system such as the design system and controller 131 shown in FIG. 1. One aspect of the invention is the inclusion of one or more agents—agents 621, 623, 625, 627, and 629 are shown in FIG. 6—that can incrementally and automatically generate, at their corresponding stage of the prepress process 603, sets of inspection instructions. The sets of inspection instructions generated by the agents are collated to form the inspection script 151. This progressive augmentation is made easier by using, for the inspection script 151, the inspection language that has a structured hierarchical model as in embodiments of the present invention.

Script Generation Aids

Creating a particular inspection instruction by a particular agent in the printing workflow 120 can be greatly facilitated with an automatic or semi-automatic method implemented by executing software instructions on the processor(s) of a processing system, such instruction, e.g., stored in a storage medium. One feature of the present invention is such automatic or semi-automatic creating of an inspection script for inspecting printed material and usable in the printing industry.

As an example, consider a designer operating at the concept stage 611. He/she uses a graphic design software tool to generate the data that eventually will cause a document to be printed as intended to create printed material. According to a method embodiment described herein, the software tool includes elements to implement a method to generate inspection instructions for an inspection script. Specifiers constituting each inspection instruction are created from the document data just generated by the graphic designer.

The same principle holds for other agents in the chain. One aspect of the invention is generating a part of the inspection script 151 at one or more stages of generating workflow information that could be relevant for inspection.

Automated Workflow

While not limited to such workflows, one application of embodiments of the invention is in automated printing workflows. Modern automated printing shops are backed by a computer-based architecture with agreed ways of representing the relevant data. Such data may include workflow data sets, e.g., in the form of workflow data files. Examples of such data workflow data files include:

- Files containing the information to be printed (document data). These typically are page description language (PDL) files, such as PDF files that contain the data that represents the characteristics of documents to be printed (document data) to form the printed material.
- Files defining the printing job, in terms of the actions (process steps) required to produce the printed material (process data). In one embodiment, the process data includes one or more files in a job description language, e.g., Job Definition Format (JDF). JDF is a technical standard being developed by the graphic arts industry to facilitate cross-vendor workflow implementation to define process data. A job description language is also called a process language herein.

To appreciate the state of the art in printing automation, see Thomas Hoffmann-Walbeck: JDF-Integration and Automation, *International Circle of Educational Institutes for Graphic Arts Technology and Management (IC)*, Issue No 1 2008. This article provides an example of how data communication can be organized in an automated print shop. In the case reported in the article, JDF is used. For more on JDF, see the Web Wikipedia entry en~dot~wikipedia~dot~org/wiki/Job_Definition_Format, retrieved 9 Dec. 2011, where ~dot~ denotes the period (".") in the actual URL.

Thus, typically, an automated printing workflow is supported by a computer-based architecture with agreed ways of representing the relevant data as workflow data sets, such as document data represented by PDF files, and process data represented by JDF files.

One aspect of the invention applicable to automated workflows is that the inspection script 151 produced is linked to these workflow data sets, as they provide the fundamental quantitative (and partially qualitative) information to define aspects of the printing workflow stages and the product. The present invention introduces the innovative ingredients to support the automation of inspection in the printing workflow, in addition to the automation of manufacturing.

Examples of features characterized in the workflow include, but are not limited to, one or more of: the color of a given pattern to be printed; the graphical contents of a given area; and the place where a printed element, e.g., a label should be cut.

One aspect of the invention includes the inspection language 151 including constructs: 1) to address quantitative information found in the workflow, e.g., in the workflow data sets, and 2) to express particular requirements on it, through one or more criteria and/or one or more tolerances.

Different embodiments of the invention use different ways to implement the logical connection between the workflow data and the inspection script.

One embodiment includes extending the JDF conventions to support the inspection specification, or a part thereof.

One embodiment includes extending the PDF conventions to support the inspection specification, or a part thereof.

One embodiment includes providing cross links between the workflow data set, e.g., files, and the inspection script data files.

One embodiment includes a specialized computer-driven user interface to import the relevant workflow data into the script generation environment.

One embodiment of the present invention includes checking a PDL file representing a plurality of graphical objects and associated graphical design rules, to generate a set of inspection tasks on the PDL file. In such a technique, a method includes identifying a subset of the graphical data representing a graphical object, determining a set of inspection instructions for the object so that an inspection task includes matching the object with observed data to ascertain if the observed data of the graphical object is in violation of one or more inspection rules.

Conducting the Inspection

One aspect of the invention is a method of conducting an inspection comprising executing an inspection script 151 on the inspection system 155, e.g., using an inspection processing system in or coupled to the inspection system. In some embodiments, as described above, the inspection system 155 comprises one or more inspection sensors 157 and an inspection processing system 153 in or coupled to the inspection system 155. The inspection processing system 153 can take the form of the processing system 250.

Figure 7:
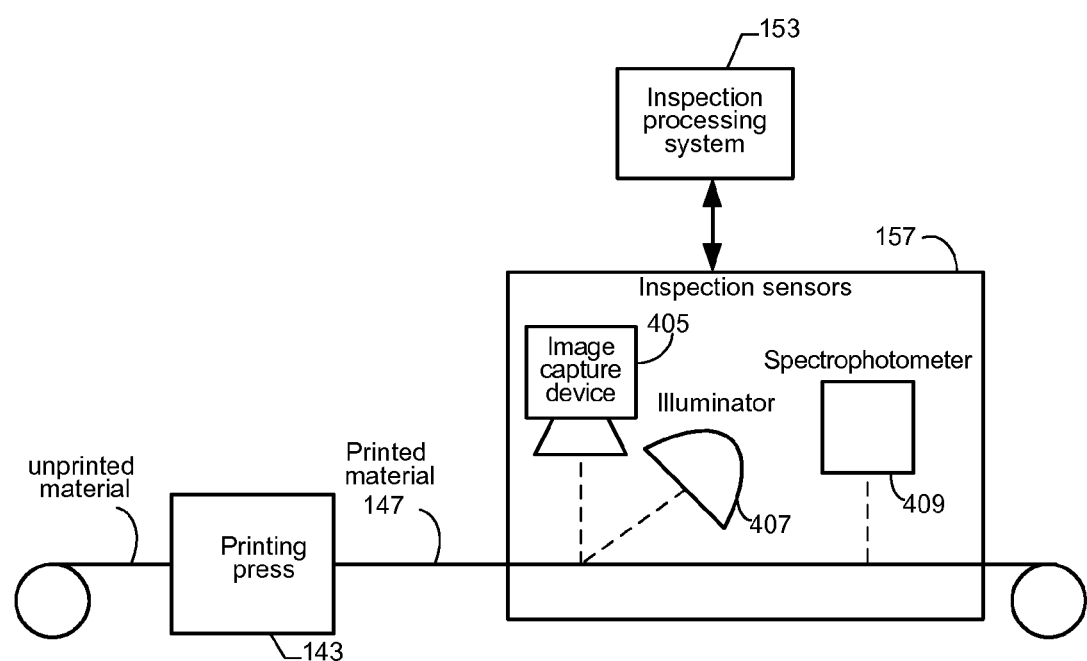
FIG. 7 is an illustration of one placement of inspection sensors of an inspection system in an automated system according to an embodiment of the present invention.

FIG. 7 is an illustration of one placement of the inspection sensor(s) 157 of the inspection system 155 in an automated system. In this system, the printed material 147 passes under a scanner comprising an illumination device 407 and an image capture device 405, e.g., a line-scan camera. The color characteristics of the two components, e.g., colorimetric or spectrometric characteristics, are controlled, in such a way the color response of the image capture is known.

In this example, every part of the printed material 147 is scanned and reported to the inspection processing system as an array of pixels at a particular resolution, which in one embodiment is pre-defined, and in another is specified by a parameter.

In this example, a second sensor, a spectrophotometer 409, is included as one of the inspection sensors, and provides information on the color of the printed material 147, e.g., at a certain location. It is common to print test patches of different colors, e.g., different densities of the colorants, in an area of a printed page or unit of the printed material 147. One example use of a spectrophotometer such as 409 is to measure the color of such patches to provide data to evaluate the printing process and/or to control the colorimetric response of the scanner.

Note that FIG. 7, which is a non-limiting example application, shows a part of a web-fed printing workflow. The invention is not limited to such an application, and can be used in a sheet-fed printing workflow, a packaging printing workflow, and so forth.

Inspection Workflow

Figure 8:
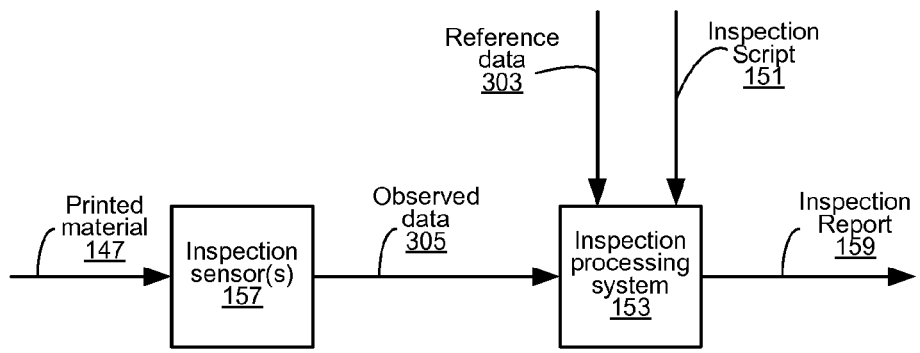
FIG. 8 shows one example of the processing steps of an inspection workflow according to an embodiment of the present invention.

FIG. 8 shows one example of the processing steps of inspection workflow according to an embodiment of the present invention. FIG. 8 shows how different elements, e.g., the inspection sensor(s) 157 and the inspection processing system 153 accept and generate data. In this arrangement, elements 157 and 153 are cascaded. The start of the workflow is the printed material 147 and the end produce is the inspection report 159.

In one embodiment, the inspection sensor(s) acts independently, taking the printed material 147 as an input, and delivering observed data 305 as an output. In one embodiment, such obtaining observed data 305 is synchronized with a material handling system that deals with handling the printed material 147 to provide consistent observations of each instance of the printed material 147. The inspection processing system 153 is a computer-based device that executes instructions of the inspection script 151 on each set of observed data 305. From the content of the inspection script 151, the inspection processing system 153 infers exactly how to conduct the inspection. For each inspection task defined in the inspection script 151, the inspection processing system 153 uses a geometry specifier 501 to locate in the observed data where there is something to inspect. The inspection processing system 153 has knowledge of what to expect at that location from a content specifier 503 constructed using reference data 303 provided to the inspection processing system 153. In some embodiments, color is handled appropriately with the aid of a color specifier 502. One or more rule specifiers 504 instruct the inspection processing system 153 of the method to apply to perform the calculation task(s). A report specifier 504 tells the inspection processing system 153 how to present and possibly consolidate the information generated by the inspection algorithm.

Other Considerations

Automation of Inspection in Printing Shops

While there has been and continues to be a trend in the printing industry to automate the design and the manufacturing processes required to produce printed material, there appears to not have been attempts in the current art to include or integrate the inspection process within such automation. There have been practices developing to govern interchange of data along the successive process steps of a printing workflow (which includes finishing), typically including: order management, prepress, press, postpress and fulfillment. One aspect of the present invention is including and integrating the inspection process within this scope of automation. One aspect of the present invention includes a method that enables integrating an innovative automated inspection process into the printing workflow that, e.g., includes design and finishing.

Comprehensiveness of a Method to Represent Inspection of 2D Images

Aspects of the invention include defining, determining, and using an inspection script used to represent the inspection tasks via a set of inspection instructions. Features of some embodiments include one or more of:

Integration: One embodiment includes mapping inspection instructions to the structured object representation of the document content. The awareness of the document structure and of the exact rendering intent enables powerful innovative inspection approaches.

Extensibility: One embodiment includes the ability to support any of a wide range of inspection requirements. Depending on workflows and technologies, new classes of inspection tasks may be easily added.

System independence: One embodiment includes the ability to operate a given physical inspection device irrespective of the functional improvements induced by extensibility.

Inspection Planning in Printing

One aspect the invention is the ability to integrate the inspection tasks within the printing workflow that includes design, prepress and actual printing. Another aspect is the ability to offer certification.

Relationship Between Concepts

Figure 11:
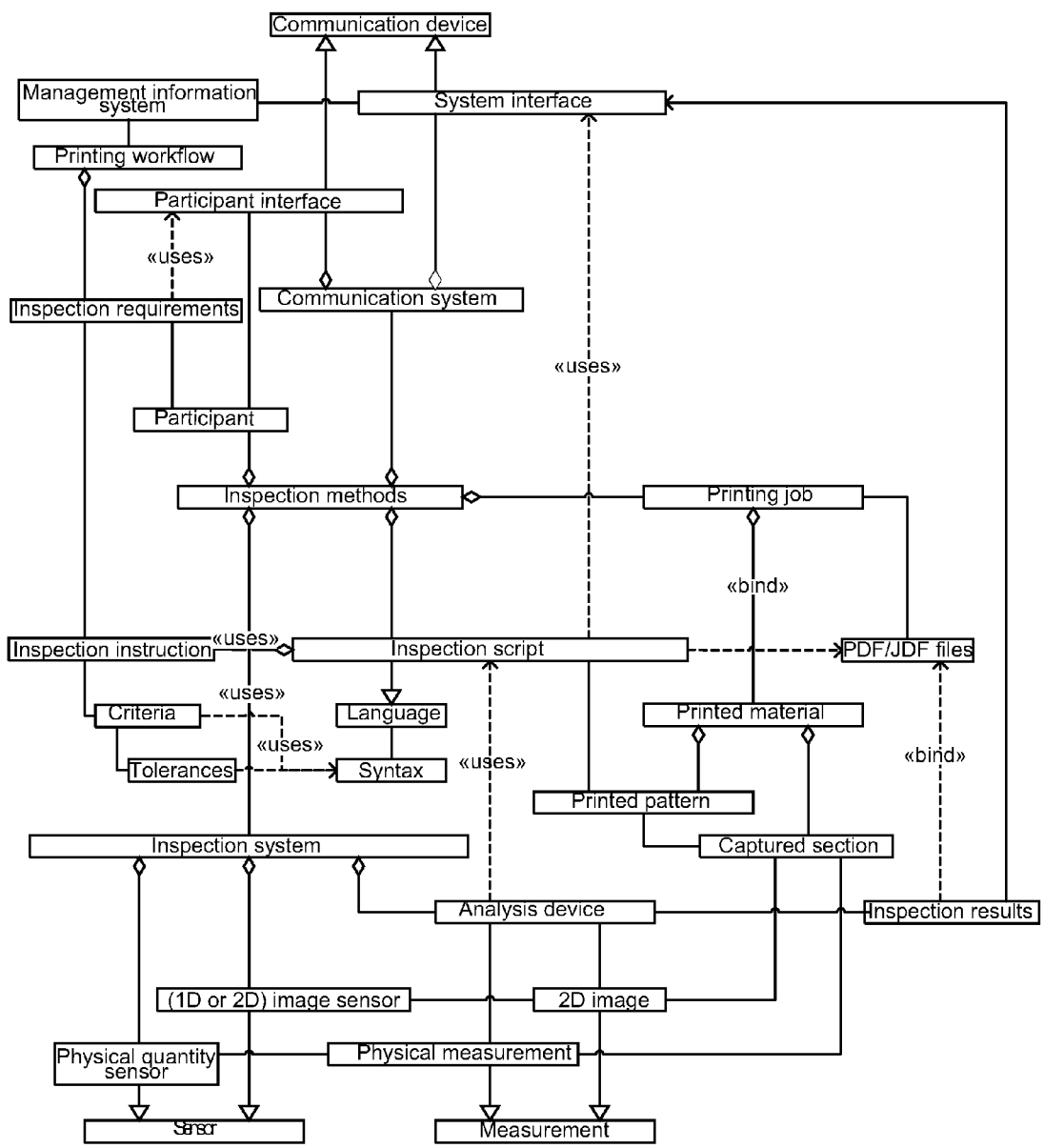
FIG. 11 shows in a diagrammatic form the concepts used in embodiments of the present invention, and their relationship.

FIG. 11 shows in a diagrammatic form the concepts used in embodiments of the present invention, and their relationship.

General Comments

Unless specifically stated otherwise, as apparent from the following description, it is appreciated that throughout the specification discussions utilizing terms such as "processing," "computing," "calculating," "determining" or the like, may refer to, without limitation, the action and/or processes of hardware, e.g., an electronic circuit, a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., of such steps is implied, unless specifically stated.

The methodologies described herein are, in some embodiments, performable by one or more processors that accept logic, e.g., instructions encoded on one or more computer-readable media. When executed by one or more of the processors, the instructions cause carrying out at least one of the methods described herein. Any processor capable of executing a set of instructions (sequential or otherwise) that specify actions to be taken is included. Thus, one example is a typical processing system that includes one or more processors. Each processor may include one or more of a CPU or similar element, a graphics processing unit (GPU), field-programmable gate array, application-specific integrated circuit, and/or a programmable DSP unit. The processing system further includes a storage subsystem with at least one storage medium, which may include memory embedded in a semiconductor device, or a separate memory subsystem including main RAM and/or a static RAM, and/or ROM, and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The term storage device, storage subsystem, or memory unit as used herein, if clear from the context and unless explicitly stated otherwise, also encompasses a storage system such as a disk drive unit. The processing system in some configurations may include a sound output device, and a network interface device.

In some embodiments, a non-transitory computer-readable medium is configured with, e.g., encoded with instructions, e.g., logic that when executed by one or more processors of a processing system such as a digital signal processing device or subsystem that includes at least one processor element and a storage subsystem, cause carrying out a method as described herein. Some embodiments are in the form of the logic itself. A non-transitory computer-readable medium is any computer-readable medium that is statutory subject matter under the patent laws applicable to this disclosure, including Section 101 of Title 35 of the United States Code. A non-transitory computer-readable medium is for example any computer-readable medium that is not specifically a transitory propagated signal or a transitory carrier wave or some other transitory transmission medium. The term "non-transitory computer-readable medium" thus covers any tangible computer-readable storage medium. In a typical processing system as described above, the storage subsystem thus includes a computer-readable storage medium that is configured with, e.g., encoded with instructions, e.g., logic, e.g., software that when executed by one or more processors, causes carrying out one or more of the method steps described herein. The software may reside in the hard disk, or may also reside, completely or at least partially, within the memory, e.g., RAM and/or within the processor registers during execution thereof by the computer system. Thus, the memory and the processor registers also constitute a non-transitory computer-readable medium on which can be encoded instructions to cause, when executed, carrying out method steps. Non-transitory computer-readable media include any tangible computer-readable storage media and may take many forms including non-volatile storage media and volatile storage media. Non-volatile storage media include, for example, static RAM, optical disks, magnetic disks, and magneto-optical disks. Volatile storage media includes dynamic memory, such as main memory in a processing system, and hardware registers in a processing system.

While the computer-readable medium is shown in an example embodiment to be a single medium, the term "medium" should be taken to include a single medium or multiple media (e.g., several memories, a centralized or distributed database, and/or associated caches and servers) that store the one or more sets of instructions.

Furthermore, a non-transitory computer-readable medium, e.g., a computer-readable storage medium may form a computer program product, or be included in a computer program product.

In alternative embodiments, the one or more processors operate as a standalone device or may be connected, e.g., networked to other processor(s), in a networked deployment, or the one or more processors may operate in the capacity of a server or a client machine in server-client network environment, or as a peer machine in a peer-to-peer or distributed network environment. The term processing system encompasses all such possibilities, unless explicitly excluded herein. The one or more processors may form a personal computer (PC), a media playback device, a headset device, a hands-free communication device, a tablet PC, a set-top box (STB), a Personal Digital Assistant (PDA), a game machine, a cellular telephone, a smartphone, a Web appliance, a network router, switch or bridge, or any machine capable of executing a set of instructions (sequential or otherwise) that specify actions to be taken by that machine.

Note that while some diagram(s) only show(s) a single processor and a single storage subsystem, e.g., a single memory that stores the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, as will be appreciated by those skilled in the art, embodiments of the present invention may be embodied as a method, an apparatus such as a special purpose apparatus, an apparatus such as a data processing system, logic, e.g., software embodied in a non-transitory computer-readable medium, or a computer-readable medium that is encoded with instructions, e.g., a computer-readable storage medium configured as a computer program product. The computer-readable medium is configured with a set of instructions that when executed by one or more processors cause carrying out method steps. Accordingly, aspects of the present invention may take the form of a method, an entirely hardware embodiment, a software executable running in one or more processors, or an embodiment combining software and hardware aspects. Furthermore, the present invention may take the form of program logic, e.g., a computer program on a computer-readable storage medium, or the computer-readable storage medium configured with computer-readable program code, e.g., a computer program product.

It will also be understood that embodiments of the present invention are not limited to any particular implementation or programming technique and that the invention may be implemented using any appropriate techniques for implementing the functionality described herein. Furthermore, embodiments are not limited to any particular programming language, scripting language, page description language, printing process language, or operating system.

Reference throughout this specification to "one embodiment," "an embodiment," "some embodiments," or "embodiments" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All U.S. patents, U.S. patent applications, and International (PCT) patent applications designating the United States cited herein are hereby incorporated by reference. In the case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of other art in this specification should in no way be considered an admission that such art is widely known, is publicly known, or forms part of the general knowledge in the field at the time of invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

In addition, use of the "a" or "an" are used to describe elements and components of the embodiments herein. This is done merely for convenience and to give a general sense of the invention. This description should be read to include one or at least one and the singular also includes the plural unless it is obvious that it is meant otherwise.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention, to the extent permitted by law. For example, to the extent permitted by law: any formulas given above are merely representative of procedures that may be used; functionality may be added or deleted from the block diagrams and operations may be interchanged among functional blocks; and steps may be added to or deleted from methods described within the scope of the present invention.

We claim:

1. A machine-implemented method of planning inspection of printed material produced according to a printing workflow, the printing workflow including a production stage, and one or more of a design stage, a prepress stage, and a finishing stage, the method comprising:
    automatically or semi-automatically generating inspection instructions specific to a printing job using data used or produced during one or more stages of the printing workflow, including during one or more of the design stage, the prepress stage and the finishing stage, wherein the inspection instructions include instructions that define inspection of printed material created in the printing job according to the printing workflow, and wherein the semi-automatically generating, if there is any, includes automatically generating and generating using at least one interaction with at least one human participant of the printing workflow;
    combining the generated job-specific inspection instructions to form a job-specific inspection script comprising machine-readable information, including machine-readable commands related to the printed material produced in the job according to the printing workflow;
    wherein the job-specific inspection script when provided to a processing system coupled to or included in an inspection system for inspecting printed material produced in the job according to the printing workflow, causes, when the provided commands are executed, the inspection system to carry out one or more inspection tasks on instances of the printed material, each instance comprising a single or repeated printed pattern that includes content and layout, and
    wherein the inspection system comprises one or more sensors, each sensor operative to perform one or more measurements on at least one section of instances of the printed material.

2. A machine-implemented method as recited in claim 1, wherein the inspection instructions are in a formally-defined inspection language to define inspecting tasks that form the components of an inspection job.

3. A machine-implemented method as recited in claim 1, wherein the inspection instructions are in a formally-defined language that includes instructions to accommodate variable printing, the accommodating instructions, when provided to the processing system coupled to or included in the inspection system and executed, causing the inspection system to inspect instances of the printed material that vary from instance to instance, including inspecting one or more elements that vary from instance to instance of the printed material.

4. A machine-implemented method as recited in claim 1, wherein at least some of the inspection instructions address conformance of an specified aspect of the printed material to one or more specified criteria.

5. A machine-implemented method as recited in claim 1, wherein the inspection instructions include a plurality of specifiers, each of the specifiers including a set of valued parameters, the plurality of specifiers comprising one or more of:
    a geometry specifier specifying one or more locations on the printed material;

a color specifier specifying one or more colors of the printed material;

a content specifier specifying one or more aspects of content of the printed material;

a rule specifier specifying one or more rules for inspecting the printed material; and a report specifier specifying one or more parameters according to which a report of the inspecting is generated.

6. A machine-implemented method as recited in claim 1, wherein inspection instructions included within the inspection script reflect and depend on characteristics of one or more image reproduction processes or other manufacturing processes defined or occurring during the printing workflow.

7. A machine-implemented method as recited in claim 1, wherein the script further comprises inspection instructions that cause, when the commands of the job-specific script are executed, calibrating at least one sensor of the one or more sensors.

8. A machine-implemented method as recited in claim 1, wherein the one or more sensors include at least one of an image capture device, a sensor to measure densitometric information, a sensor to measure photometric information, and a sensor to measure colorimetric information.

9. A machine-implemented method as recited in claim 1, wherein the script further comprises inspection instructions that cause, when executed, accepting and analyzing data from at least one of the one or more sensors, and reporting results that qualify the conformance of specified aspects of at least one section of an instance or instances of the printed material to specified criteria with specified tolerances.

10. A machine-implemented method as recited in claim 1, wherein the script further comprises inspection instructions that cause, when executed, carrying out certification, including producing a certificate that attests to how the printed material produced by a printing job according to the printing workflow conforms to one or more inspection requirements prescribed in the inspection script.

11. A machine-implemented method as recited in claim 1, wherein at least some of the inspection instructions are generated by interactions with one or more participants included in the printing workflow, the one or more participants including at least a set of software agent instructions that when executed carry out specific role or roles related to the printing workflow using data used in or generated by a stage of the printing workflow, and, in the case the workflow includes one or more human participants, at least one human participant.

12. A machine-implemented method as recited in claim 1, wherein the inspection instructions are generated sequentially, in several stages of the prepress workflow.

13. A machine-implemented method of inspecting printed material produced according to a printing workflow, the printing workflow including a production stage, and one or more of a design stage, a prepress stage, and a finishing stage, the method comprising:

accepting in an inspection processing system an inspection script specific to a printing job, and comprising machine-readable inspection information including machine-readable commands related to the printed material produced in the job according to the printing workflow, the inspection processing system coupled to or included in an inspection system;

executing the commands of the accepted job-specific inspection script to cause the inspection system to carry out one or more inspection tasks on instances of the printed material produced in the job according to the printing workflow, the inspection tasks including performing measurements on at least one section of instances of the printed material to produce observed data, and using the observed data for inspecting the instances, wherein the job-specific inspection script is determined by combining job-specific inspection instructions automatically or semi-automatically generated using data used or produced during one or more stages of the printing workflow, including during one or more of the design stage, the prepress stage and the finishing stage, and wherein the semi-automatically generating, if there is any, includes automatically generating and generating using at least one interaction with at least one human participant of the printing workflow.

14. A machine-implemented method as recited in claim 13, further comprising:

accepting reference data from one or more data repositories, the reference data representing characteristics that the printed material must comply with; and analyzing the observed data with respect to the reference data.

15. A machine-implemented method as recited in claim 13, wherein the analyzing includes selecting one or more reference data elements as a target and evaluating quantitatively how data elements of the observed data match or mismatch the target.

16. A machine-implemented method as recited in claim 13, wherein the observed data includes any or a combination of image data and physical data.

17. A machine-implemented method as recited in claim 13, wherein the reference data includes any or a combination of document data, process data, content data, and sampled data.

18. A machine-implemented method as recited in claim 13, further comprising:

generating an inspection report for the one or more inspection tasks carried out by the inspection system.

19. A machine-implemented method as recited in claim 18, wherein the inspection report includes any or a combination of a quality report, a process report, and a certification report.

20. A machine-implemented method as recited in claim 13, wherein the inspection instructions are in a formally-defined language.

21. A machine-implemented method as recited in claim 13, wherein the inspection instructions include a plurality of specifiers, each of the specifiers including a set of valued parameters, the plurality of specifiers comprising one or more of:

a geometry specifier specifying one or more locations on the printed material;

a color specifier specifying one or more colors of the printed material;

a content specifier specifying one or more aspects of content of the printed material;

a rule specifier specifying one or more rules for inspecting the printed material; and a report specifier specifying one or more parameters according to which a report of the inspecting is generated.

22. A machine-implemented method as recited in claim 13, wherein the inspection system includes one or more sensors operative to perform one or more of the measurements on at least one section of instances of the printed material.

23. A machine-implemented method as recited in claim 22, wherein the script further comprises inspection instructions that cause, when the commands of the job-specific script are executed, calibrating at least one sensor of the one or more sensors,
the method further comprising:
calibrating the at least one sensor.

24. A machine-implemented method as recited in claim 13, wherein the inspection system includes one or more sensors, including at least one of an image capture device, a sensor to measure densitometric information, a sensor to measure photometric information, and a sensor to measure colorimetric information.

25. A machine-implemented method as recited in claim 13, further comprising:
carrying out certification, including producing a certificate that attests to how the printed material produced by a printing job according to the printing workflow conforms to one or more inspection requirements prescribed in the inspection script.

26. An inspection system for inspecting printed material produced according to a printing workflow, the printing workflow including a production stage, and one or more of a design stage, a prepress stage, and a finishing stage, the inspection system comprising:
an inspection processing system, including one or more processors and a storage subsystem; and
one or more sensors coupled to the inspection processing system,
wherein the one or more sensors are operative to perform measurements on at least one section of instances of the printed material, the measurements generating observed data from the printed material;
wherein the inspection processing system is operative to accept a script specific to a printing job, the script comprising machine-readable inspection information including machine-readable commands related to the printed material produced in the job according to the printing workflow, the inspection processing system further operative to carry out the commands in the script to cause the inspection system to carry out one or more inspection tasks on instances of the printed material according to the observed data of the printed material, and
wherein the job-specific inspection script is determined by combining job-specific inspection instructions automatically or semi-automatically generated using data used or produced during one or more stages of the printing workflow, including during one or more of the design stage, the prepress stage and the finishing stage, and
wherein the semi-automatically generating, if there is any, includes automatically generating and generating using at least one interaction with at least one human participant of the printing workflow.

27. A system as recited in claim 26, wherein the one or more sensors include an illuminator and an image capture device.

28. A system as recited in claim 26, wherein the one or more sensors include at least one of a sensor to measure densitometric information, a sensor to measure photometric information, and a sensor to measure colorimetric information.

* * * * *